Feb. 25, 1947.   N. H. YOUNG, JR   2,416,367
PULSE GENERATING SYSTEM
Filed July 30, 1942

INVENTOR
NORMAN H. YOUNG, JR.
BY
ATTORNEY

Patented Feb. 25, 1947

2,416,367

UNITED STATES PATENT OFFICE 2,416,367

PULSE GENERATING SYSTEM

Norman H. Young, Jr., Jackson Heights, N. Y., assignor to Federal Telephone and Radio Corporation, a corporation of Delaware Application July 30, 1942, Serial No. 452,901

10 Claims. (Cl. 250—36)

This invention relates to pulse generating systems and one of the objects of this invention is to provide method and means for effecting substantially uniform pulse generation.

Another object of the invention is to provide method and means to minimize noise effects in pulse generation and transmission systems such as may be used in time modulated pulse communication and/or obstacle detection apparatus operating on the pulse reflection principle. Time modulation communication equipment may be of the type generally disclosed in U. S. Patents 2,266,401 and 2,256,336 and copending applications of Emile Labin Serial No. 386,282 filed April 1, 1941, Serial No. 406,499 filed August 12, 1941, and Serial No. 449,595 filed July 3, 1942. Examples of obstacle detecting apparatus may be seen in copending applications of H. Busignies Serial No. 381,640 filed March 4, 1941 and E. Labin Serial No. 400,259 filed June 28, 1941.

Still another object of the invention is to provide method and means to make pulse generation more regular both in pulse amplitude and the effective duration thereof.

I have observed by oscillographic means that an ultra high frequency oscillator whose anode voltage is momentarily supplied from a pulse modulator so that the oscillator normally has no anode voltage but is only momentarily energized for a few microseconds out of each millisecond, does not yield pulses of constant amplitude, but instead pulses having amplitudes of random variation in amplitude and duration to extents of from about five to fifteen percent depending upon certain adjustments. I have also observed that where the pulses are amplified with a greatly extended time base, that the exact build-up time or excitation of all pulses is not the same.

Heretofore, anode voltage impulses applied to the oscillator operated merely to bring the oscillator from a point of substantially stable quiescent equilibrium to a point of highly unstable equilibrium but did not of themselves provide any excitation to initiate the pulse oscillations. It is believed that the pulse oscillation is initiated after an anode voltage impulse is applied to the oscillator by thermal or circuit noise conditions and that the oscillation pulse builds up from a very small value in an exponential fashion. This may be likened to super-regenerative receivers having a separate quench oscillator. As is well-known, this type of receiver operates in a manner conditioned by random fluctuations of circuit noise which causes it to start in an erratic manner and attain an uneven amplitude from pulse to pulse, thus giving in the output a characteristic noise known as "super-regenerative rush."

Referring to pulse generation, even if the rate of rise takes place according to a very high exponent, it is clear that some time will be required for the oscillations to reach, say, a 3000-volt intensity if these oscillations are assumed to originate at a very small intensity of the order of one millionth or one billionth of a volt. Since this random voltage may vary erratically from zero to a maximum amplitude, variations in this random voltage during the times plate voltages are applied to the oscillator will cause a greatly amplified difference in the amplitude and duration of the successive pulse envelopes generated. As a consequence the pulses at the receiver will cause response time to vary at the leading or trailing edge of the received pulses, even when no time modulation is present. This variation in time will produce a noise in the receiver. In addition, the series of transmitted impulses may be amplitude modulated by voice signals, for example, as disclosed in the copending application of E. Labin, Serial No. 386,282 filed April 1, 1941. If the variations in impulse amplitude due to effects other than signals are present, considerable noise will be observed in this channel.

I have discovered method and means to provide pulse generation wherein the pulses are substantially regular in time duration and substantially constant in amplitude. This I accomplish by applying to the oscillator a weak oscillation at a high frequency sufficient to insure excitation of the oscillator at substantially equal initiation amplitudes during the times anode energizing potentials are applied thereto. In other words the applied oscillation is additive to the random voltage, the former being from about 4 to 20 times the amplitude of the latter so that the effect of variations in the random voltage is greatly reduced percentagewise.

The weak oscillation may be applied to the oscillator continuously and by many different means. In one form of the invention, a small continuous oscillation is applied by loosely coupling to the grid circuit of the pulse oscillator a low power oscillator tuned to approximately the carrier frequency of the pulse envelope. This application of small amplitude oscillation in the grid circuit removes the necessity of relying upon circuit noise as a starting condition of the pulse oscillations. This insures a substantially uniform starting condition for every oscillation pulse so that each pulse generated will have substantially identical amplitude and substantially equal duration. This may also be accomplished in another form of the invention by coupling a high Q tank circuit to either the grid or plate circuits of the oscillator and tuning the tank circuit to the carrier frequency of the pulse envelope. Tank circuit will absorb energy during the generation of a pulse envelope, and by virtue of its low losses, sustains low oscillations at least as long as the time interval between pulses so that it will furnish an applied oscillation of substantially equal amplitude to the grid or plate circuit, as the case may be, at the instances anode voltage impulses are applied to the oscillator.

For a further understanding of the invention, reference may be had to the following detailed description to be read in connection with the accompanying drawings, in which Fig. 1 is a graphic illustration of pulses generated by an oscillator prior to the application thereto of the principles of this invention;

Figure 1:
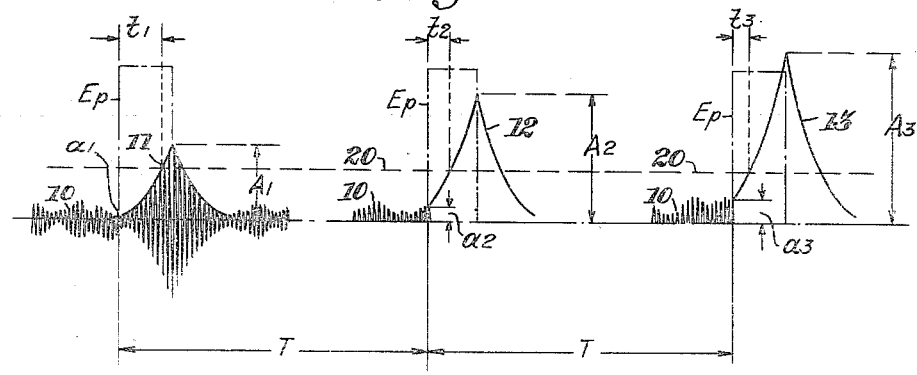

Referring to Fig. 1 of the drawings, three pulses 11, 12 and 13 are shown wherein they illustrate in an exaggerated manner the pulse envelope variation of existing pulse oscillators, such, for example, as the push-pull type, prior to the application thereto of the principles of this invention. The pulse 11 which has an amplitude A1 is shown as having been initiated by random voltage or current disturbances 10 at an amplitude $a1$. The pulses 12 and 13 having amplitudes A2 and A3 are shown to have been initiated by random voltage at amplitudes $a2$ and $a3$, respectively. The amplitudes $a1$, $a2$ and $a3$ of the random voltage 10 illustrate the variation in the excitation voltage present in the oscillator which heretofore has been relied upon to excite the pulse envelope oscillation the instant the anode potential $E_p$ is applied to the oscillator. The reason for this variation in the excitation voltage 10, as hereinbefore suggested, is caused by the variation in thermal and noise effects producing the random voltage condition in the grid and/or plate circuits. Since the random voltage varies in amplitude from about zero to a maximum amplitude, such variation, although it may be minute in value, has an important bearing upon the amplitude of the pulse envelope and the duration thereof at, say an effective reception level such as indicated by the broken line 20.

This resulting variation in the amplitude and duration of the pulse envelope is clear from an inspection of the pulse illustrations in Fig. 1. Since the pulse envelope is developed from a minute amplitude of the random voltage at the instant of the application of the anode potential impulse and builds up rapidly in an exponential fashion, the value of the amplitude of the excitation random voltage determines at which point along the exponential curve the pulse envelope starts. The particular amplitude of the random voltage also determines the height to which the pulse envelope will build by the time of cut-off of the anode voltage. Thus, should the random voltage amplitude be exceedingly small as indicated by $a1$, the excitation will start low down on the exponential curve of the pulse envelope slope and a pulse of low amplitude will be generated. Also, the effective duration of the pulse will be short. These relations are clearly seen by comparing the effective portion of pulse 11 above the effective reception line 20 with the portions of pulses 12 and 13 extending above the line 20. The pulse 12 is shown to have been excited by a random voltage amplitude $a2$ several times the amplitude $a1$. This excitation amplitude $a2$ being higher on the exponential curve or build-up slope of the pulse 12 enables the pulse amplitude A2 to be considerably greater than the amplitude A1 of pulse 11. Likewise, the pulse 13 which is initiated by a still greater excitation amplitude $a3$ will obtain a still higher amplitude A3. It will also be observed that the duration of the pulses 11, 12 and 13 as measured along the effective reception level 20 vary similarly as the amplitudes of the pulses above the same level. The variations in pulse duration is also clearly seen in the variation of the distances $t1$, $t2$ and $t3$ of the effective wave front as measured from the front of the anode voltage impulse $E_p$. Assuming pulse 12 to be average, there is shown to be amplitude and time variation in both directions because of the variations in the random voltages heretofore relied upon for excitation.

Figure 2:
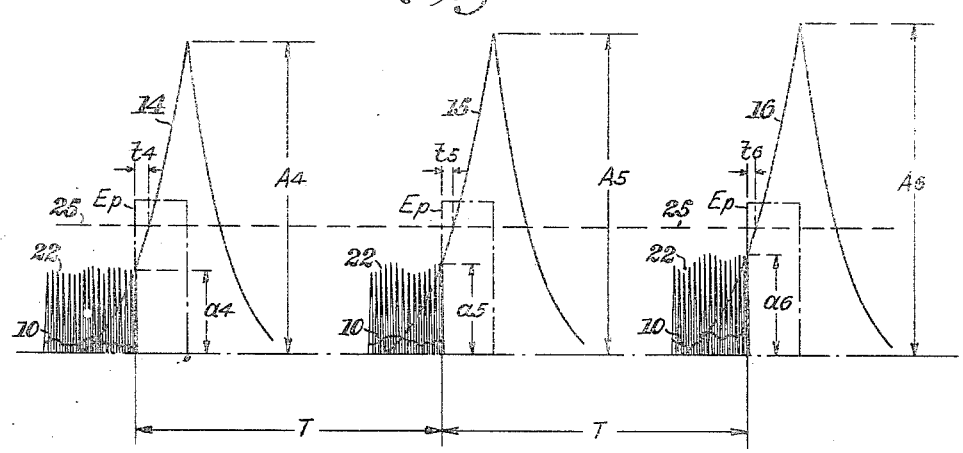
Fig. 2 is a graphic illustration of pulse generation in accordance with this invention.

As shown in Fig. 2 of the drawings, pulses 14, 15 and 16 generated by a pulse generator operated in accordance with this invention have substantially the same amplitude and are also substantially regular in duration and pulse area above the effective reception level 25. This regularity and sameness of pulse generation is accomplished in accordance with this invention by applying to the oscillator a weak oscillation 22 which is continuous and which has a high frequency approximating the carrier frequency of the pulse envelope. This applied weak oscillation acts additively to the random voltage present to establish an excitation voltage of substantially constant amplitude. This consistency of a high excitation voltage results even though the corresponding frequency component of the random voltage 10 is added thereto because the variations in the random voltage are now greatly reduced percentagewise. Furthermore, the amplitude of the exciting voltage being higher up on the exponential curve of the pulse envelope, the same variation in random voltage has considerably less variation effect upon the amplitude and duration of the pulse envelope since the curvature of the envelope becomes less and less as it builds up.

This more regular pulse generation effect is believed to be clearly illustrated in Fig. 2. The applied oscillation 22 is of an amplitude about 4 to 20 times the varying amplitude of the random voltage 10.

The excitation voltages, of course, are shown at an exaggerated scale and the pulse envelopes are also exaggerated to illustrate perceptibly the principles of the invention. It will also be understood that the effective reception levels 20 and 25 are selected for purposes of illustration only and may vary considerably depending on the efficiency and sensitiveness of the receiving apparatus.

The variations between the amplitudes $a4$, $a5$ and $a6$ are identical to the variations in the random voltage 10 at $a1$, $a2$ and $a3$ (Fig. 1), respectively. The percentage variations caused by these differences in the excitation voltage for the pulses 14, 15 and 16, however, are very small as indicated by the slight differences between the amplitudes A4, A5 and A6. Furthermore, the variation in excitation voltage is located higher up on the exponential curve of the impulse envelope and, therefore, has even less effect upon the build-up of the envelope after initiation.

While this variation is shown to have a small effect in the amplitudes A4, A5 and A6 of the pulses 14, 15 and 16, the oscillator operated in accordance with this invention when tested by an oscillograph, shows generation of pulses of substantially the same amplitude and duration and any variation therebetween is exceedingly difficult to detect. It will also be seen upon comparing t4, t5 and t6 that the effective wave fronts of the pulses 14, 15 and 16 vary only slightly with respect to the wave fronts of the anode voltage impulses $E_p$.

It is thus clear that the noise effects in either time modulated or amplitude modulated pulse systems are reduced in accordance with my invention to a very low value improving greatly the signal to noise ratio. In obstacle detecting systems the uniformity of the pulses and absence of random time displacement will improve the accuracy of distance indications.

Figures 3, 4:
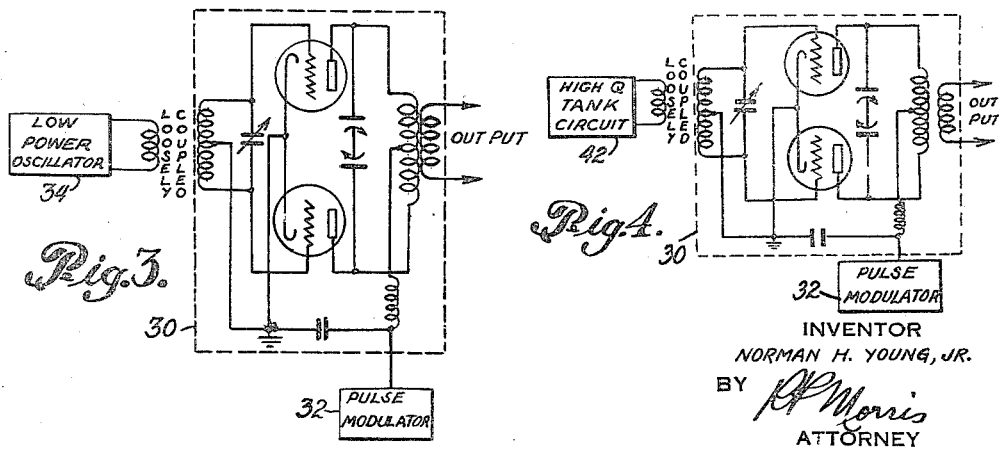
Fig. 3 is a block diagram of a pulse generating system in accordance with one form of this invention.
Fig. 4 is a block diagram of another form of pulse generation in accordance with this invention.

Referring to Fig. 3 of the drawing, I have shown a block diagram of one form of apparatus by which the method of this invention may be practiced. The ultra high frequency oscillator 30 may be of known construction arranged, such as the known push-pull oscillator, to have an anode voltage applied thereto from a pulse modulator 32 of known form so that the oscillator may be caused to provide pulse oscillation in response thereto. This may, for example, be a system such as described in the above referred to Labin application, Serial No. 406,499 filed August 12, 1941. As hereinbefore stated, I have found that a variation in pulse amplitude and duration exists in the operation of such a pulse generator system. I have overcome this variation by providing a low power oscillator 34 loosely coupled to the ultra high frequency oscillator 30 whereby the low power oscillator is adapted to apply a weak oscillation in the grid circuit of the oscillator 30. In a working embodiment of the invention, the low power oscillator used in order to accomplish this effect in accordance with the embodiment illustrated in Fig. 3 comprises a two-watt oscillator which was disposed about three feet from the oscillator 30, which had a peak output of about two kilowatts, without any antenna and it was found to eliminate substantially all of the objectionable amplitude variations and the pulse duration variations of the wave trains produced by the oscillator 30.

In Fig. 4 I illustrate another embodiment of the invention by which consistent pulse generation may be accomplished. As in Fig. 3 I show an ultra high frequency oscillator 30 associated with a pulse modulator 32 of known construction. To apply the weak oscillation effect in the grid circuit of the oscillator 32, I provide a known high Q tank circuit 42 coupled to one of the circuits, either grid or plate, and tune it to the carrier frequency of the pulse envelope. The circuit 42 may comprise any known form of tunable inductance-capacitance circuit and may, if desired, comprise a form of the known cavity type resonator. This circuit 42, whether a closed tank type or open resonator type will absorb energy during the time the oscillator is generating a pulse envelope, and by virtue of its low losses, will sustain small oscillations at least as long as the time interval between pulses so as to provide an oscillation of sufficient amplitude to excite pulse oscillation of the oscillator 30 at a high and consistent amplitude the instant anode voltage is applied thereto.

While I have shown and described but two forms of apparatus by which the method of my invention may be performed, it will be readily apparent to those skilled in the art that many additional forms and variations of those illustrated may be made without departing from the invention. For example, a residual steady plate voltage may be provided on which the pulses of the oscillator are superimposed thus allowing the oscillator to operate feebly at a low level between pulses. Another possible form may comprise a fixed negative grid bias applied to the oscillator with the intent that small oscillations might be sustained in the grid line from one pulse to another at levels below the grid bias so that the grids will not exert a damping influence. Still another possible form may comprise a displacement of the point of direct current plate feed from the center tap to one plate of a push-pull stage so that the surge of the plate current for one of the tubes will provide a starting surge through the tank circuit of the other tube. It will be understood, therefore, that the forms herein shown and described are to be regarded as illustrative of the invention only and not as a limitation on the scope thereof.

What I claim is:

1. A method of generating pulses by means of an oscillator having an anode adapted to be momentarily energized for each pulse generation, comprising applying to the oscillator an oscillation to establish therein an excitation voltage of substantially identical amplitude for each instant an anode energizing potential is applied to the oscillator so as to effect substantially identical pulse oscillation initiation, and applying to the oscillator at regular intervals an anode energizing potential thereby obtaining pulses of substantially identical amplitude.

2. The method of generating pulses as defined in claim 1 wherein the oscillations applied to the oscillator are of a continuous character.

3. The method of generating pulses as defined in claim 1 wherein the oscillation applied to the oscillator is continuous and of a frequency approximately that of the pulse envelope carrier frequency.

4. A method of generating pulses by means of an oscillator having a grid circuit and an anode, the steps of applying to said anode periodical energizing potential, and applying to the grid circuit of the oscillator an oscillation of a given amplitude additive to the usual random voltage present therein to minimize the percentage variation of random voltage and thereby establish for each anode energizing potential an excitation voltage of substantially constant amplitude.

5. A method of generating pulses by means of an oscillator having an anode adapted to be momentarily energized for each pulse generation, comprising applying periodically to the oscillator anode potential impulses of a given duration, and applying to the oscillator an excitation potential of given amplitude so that pulse oscillation is initiated at substantially the same amplitude for each anode potential impulse, whereby a train of pulse envelopes is generated having above a given effective level substantially equal amplitudes and substantially regularly timed wave fronts.

6. A pulse generator comprising an oscillator, means to apply periodically to said oscillator anode voltage impulses, and means to apply to said oscillator excitation voltage of a given amplitude so that pulse oscillation is initiated at substantially the same excitation amplitude for each anode potential impulse, whereby a train of pulse envelopes is generated having above a given effective level substantially equal amplitudes and substantially regularly timed wave fronts.

7. A pulse generator comprising an oscillator having random excitation voltage of varying amplitude, means to apply periodically an anode voltage to said oscillator to effect pulse envelope oscillation, and means to apply to the oscillator an oscillation of a given amplitude to establish an effective excitation voltage operable to effect initiation of the pulse oscillation a substantial distance up on the exponential slope of the envelope.

8. The pulse generator as defined in claim 7 wherein the means for applying the oscillation is such as to provide a continuous oscillation tunable to the carrier frequency of the pulse envelope.

9. The pulse generator as defined in claim 7 wherein the means for applying the oscillation comprises a low power oscillator loosely coupled thereto.

10. The pulse generator as defined in claim 7 wherein the means for applying the oscillation to the oscillator comprises a high Q tank circuit operable to receive energy from one of the oscillator circuits during pulse oscillation and to return oscillation energy to such circuit to establish an excitation voltage for the oscillator.

NORMAN H. YOUNG, Jr.

REFERENCES CITED

The following references are of record in the file of this patent:

UNITED STATES PATENTS

| Number | Name | Date |
| --- | --- | --- |
| 1,828,498 | Heising | Oct. 20, 1931 |
| 2,210,406 | Henderson | Aug. 6, 1940 |